Oct. 22, 1963 C. C. HORNE 3,107,416
METHOD OF MAKING TURBINE AND COMPRESSOR BLADES
Original Filed May 20, 1958

FIG. 6 (upper)

CAMPBELL C. HORNE
INVENTOR.

BY *[signature]*
ATTORNEY

United States Patent Office 3,107,416
Patented Oct. 22, 1963

3,107,416
METHOD OF MAKING TURBINE AND
COMPRESSOR BLADES
Campbell Clouston Horne, Giffnock, Scotland, assignor to
The International Nickel Company, Inc., New York,
N.Y., a corporation of Delaware
Original application May 20, 1958, Ser. No. 736,637, now
Patent No. 3,014,693, dated Dec. 26, 1961. Divided
and this application Sept. 14, 1959, Ser. No. 839,934
Claims priority, application Great Britain June 7, 1957
2 Claims. (Cl. 29—156.8)

The present invention relates to method of making turbine blades and, more particularly, fluid-cooled turbine blades made by hot working from heat resistant metal.

It is well known that in order to enable turbine and compressor blades to work at very high temperatures, longitudinal passages may be formed in them to allow air to flow through the blades and cool them. The shape of the blades is often such that at the tip there is room for only one row of passages and in consequence the total area of metal exposed to the cooling air has been directly proportional to the sum of the circumferential lengths of these passages. In other words, cooling has been limited by the number of passages which can fit in the tip of the blade.

Although attempts were made to overcome the foregoing difficulty and other disadvantages, none, as far as I am aware, was entirely successful when carried into practice commercially on an industrial scale.

It has now been discovered that by the use of a special configuration of cooling passages in a hollow turbine blade and by a method involving a special combination of operations for manufacturing such a blade, the aforementioned disadvantage may be substantially overcome.

An object of the invention is to provide a process for producing a fluid-cooled turbine blade having a special configuration of cooling passages and improved cooling characteristics.

Other objects and advantages will become apparent from the following description taken in conjunction with the accompanying drawing in which.

Generally speaking, the present invention contemplates fluid-cooled turbine blades (including compressor blades) having two sets of cooling passages which merge into each other close to the tip end of the blade and which extend substantially longitudinally, from the base of an integral root through the blade portion proper. The blade portion proper of the novel turbine blade of the present invention is tapered with the tip end thereof having the smallest cross-sectional area of the blade proper. In addition to the two sets of merging cooling passages, the novel blade of the present invention advantageously contains additional cooling passages near the leading and/or trailing edges thereof. Most advantageously, the two sets of merging cooling passages also meet in the root of the blade. The passages may advantageously be arranged in pairs so that each pair (composed of one passage from each set) forms a diamond pattern in longitudinal section normal to the chord of the blade. Each set of cooling passages advantageously consists of a plurality of cooling passages parallel to the adjacent surface of the blade.

In carrying the invention into practice, advantageous results have been obtained when the blade is made by partial extrusion of a billet in which holes have been drilled and filled with a filler which flows with the metal of the billet during the extrusion and is subsequently removed. In this case, holes are drilled into the bilet from one end to form one set of passages and then further holes, starting at the same points as the first, are made to form the second set of holes diverging from the first set. If the two sets of passages are to meet in the root, the same procedure is adopted at the other end of the billet.

The preferred way of making the holes in the billet is illustrated in the accompanying drawing.

Figure 1:
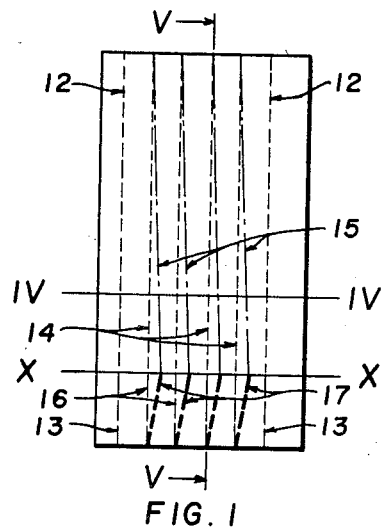
FIGURE 1 is a diagrammatical representation of the elevation of a rectangular billet as used in the present invention.
Figure 5:
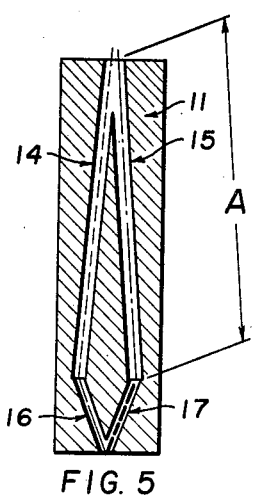
FIG. 5 is a section of the billet of FIGURE 1 along line V—V.

Referring now thereto, first to FIGURES 1 to 5, the billet 11 is rectangular and is to be converted into a blade with an integral root with cooling passages running through it. In this example, there are to be ten passages altogether, namely, two end passages and two merging sets of four passages each and to form these the first step is to drill various holes, only the center lines of which are shown in FIGURE 1. To form the end passages, two holes 12 are drilled from the tip end parallel to the sides of the billet thrrough the preselected blade portion and into the preselected root portion as far as the plane X—X and two smaller holes 13 are drilled from the opposite end to meet the holes 12. To form the merging passages, four holes 14 are drilled at an inclination to the central longitudinal plane from the same end of the billet as the holes 12, these holes also terminating at the plane X—X. Next, four more holes 15, similarly terminating at the plane X—X, are drilled from the same end starting from the same points as the holes 14 but oppositely inclined to the central plane. Then four holes 16 of smaller diameter are drilled from the root end to meet the holes 14 and are also inclined to the central plane. Finally, four holes 17, starting from the same points as the holes 16 but oppositely inclined to the holes 16 are drilled to meet the holes 15. The true length of the holes 15 is shown by the line A in FIG. 5.

Figure 6:
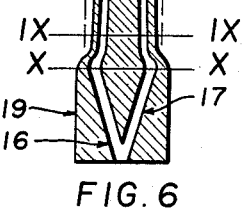
FIG. 6 shows a longitudinal section of a blade machined from the billet of FIGURE 1 after partial extrusion in accordance with the present invention.

All the holes are filled with filler material and the billet is then partly extruded through a die of airfoil cross section to form a blank 18 (indicated by dotted lines in FIG. 6) for the blade proper, some of the billet being left unextruded to form a blank 19 for the root. Subsequent operations on the blank 18 may comprise coining to give twist, heat treatment and machining to the final blade form shown at 20. The filler is removed, e.g., by acid leaching, before or after the machining.

Figure 7:
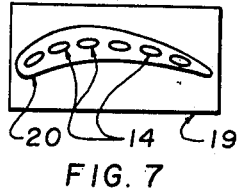
FIG. 7 is a view from the tip end of the blade shown in FIG. 6.
Figure 2:
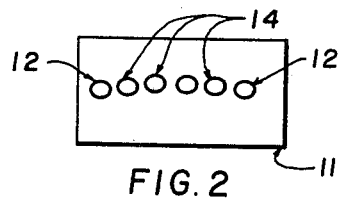
FIG. 2 depicts a view of the billet of FIGURE 1 from above.
Figure 11:
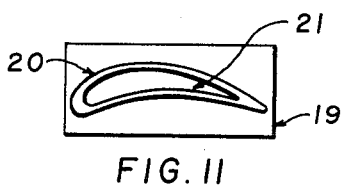
FIG. 11 is a tip end view similar to FIG. 7 after a further operation in accordance with the invention.

The single row of passages at the tip, indicated at 14 in FIG. 7, may be converted into a slot 21, as shown in FIG. 11 by machining which may be of the kind known as spark erosion.

It will be observed that in the final blade form 20, the passages lie close inside the blade surface and so are more effective in cooling than passages of the same size and shape extending along the camber line.

Figure 8:
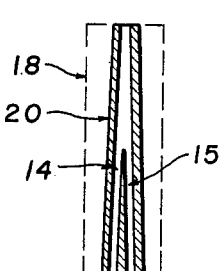
FIGS. 8, 9 and 10 are sections of the blade shown in FIG. 6 along the lines VIII—VIII, IX—IX and X—X, respectively.
Figure 8:
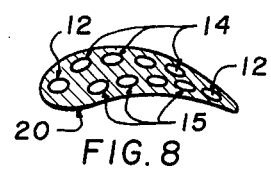
Figure 3:
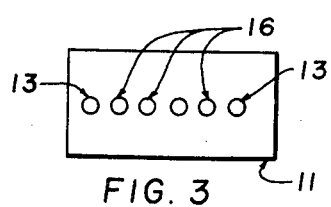
FIG. 3 shows a view of the billet of FIGURE 1 from below.
Figure 9:
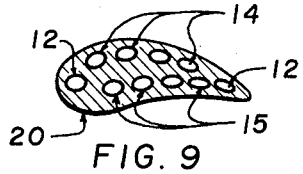
Figure 4:
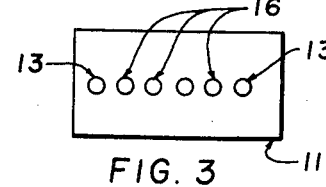
FIG. 4 illustrates a section of the billet of FIGURE 1 along line IV—IV.
Figure 10:
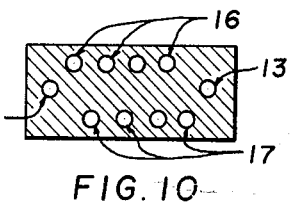

For maximum cooling, the circumferential length of each passage should be as long as possible but as the initial holes are increased in diameter, their centers are necessarily displaced further from the edges of the billet and the resultant passages do not lie as close to the surfaces as is required in many blades. Good cooling can, however, be obtained if the inclinations at which the initial holes are drilled are such that the holes in the two sets are staggered in the manner shown in FIGS. 8 and 9.

The present invention is particularly applicable to blades of gas turbines where the blades are subjected to extreme elevated temperatures and where efficient cooling is a practical necessity. By the use of the present invention, adequate cooling of integral heat-resistant metal blades is achieved even though the blade design requires a very thin tip, for example, usually not greater than about 0.150 inch as a maximum thickness.

With respect to the manufacture of turbine blades by means of the novel process, it should be understood that the term "heat-resistant metal" is used to include austenitic nickel-chromium alloys, including nickel-chromium-iron and nickel-chromium-cobalt alloys, and cobalt-chromium alloys, including cobalt-chromium-iron alloys, which contain a total of at least about 25% nickel plus chromium, cobalt plus chromium or nickel plus chromium plus cobalt (i.e., a total of at least about 25% of chromium plus nickel and/or cobalt), in addition to small amounts of aluminum, titanium, molybdenum, tungsten, niobium, tantalum, silicon, manganese, zirconium and boron with the balance iron, if any, which may optionally be present in the alloys. These alloys are adapted to be subjected in use to temperatures up to about 700° C. or above, and, accordingly, must be hot worked at temperatures about 1200° C. Fillers adapted to cooperate with such heat-resistant metal may be ferritic alloys of iron, manganese and titanium containing from about 5% to about 20% manganese, about 1% to about 10% titanium with the balance essentially iron. These steel filler materials are described and claimed in the Betteridge U.S. application Serial No. 509,380, now U.S. Patent No. 2,891,307. Other advantageous filler materials are metal-ceramic mixtures having a continuous metal phase and containing about 5% to about 25% ceramic material, e.g., magnesia and the balance metal, e.g., iron. Such metal-ceramic fillers are described and claimed in the Hignett U.S. application Serial No. 472,755, now U.S. Patent No. 2,941,281.

The present application is a division of my co-pending U.S. patent application Serial No. 736,637, filed May 20, 1958, now U.S. Patent No. 3,014,693.

Although the present invention has been described in conjunction with preferred embodiments, it is to be understood that modifications and variations may be resorted to without departing from the spirit and scope of the invention, as those skilled in the art wil readily understand. Such modifications and variations are considered to be within the purview and scope of the invention and appended claims.

I claim:
1. A process for the production of a fluid-cooled tapered turbine blade having a root integral with the blade and having a plurality of paired cooling passages extending from the tip end of said blade to the end of said root, which pairs merge at the tip of the root and blade, which comprises providing a billet of heat-resistant metal having a predetermined blade portion and root portion, forming and filling a plurality of paired holes extending from the tip of the blade portion of said billet into the root portion thereof, each of said pairs of holes extending from a single hole in the tip of the blade portion of said billet and each of said holes of said pair being oppositely inclined from the longitudinal axis of said billet, forming and filling a plurality of paired holes extending from the end of the root portion of said billet, each of said pairs of holes extending from a single hole in the end of the root portion of said bilet and each hole of said pairs connecting with one of said originally formed and filled holes, partially extruding the bilet containing the filled holes with the blade portion leading and the root portion trailing to provide a blade blank having an extruded blade portion and an unextruded root portion, machining said extruded blade portion to provide tapered blade surfaces thereon parallel to and spaced apart from the paired filled holes in said blade portion, working said machined blade portion to final blade configuration and thereafter removing the filler from the formed intergal blade to provide a turbine blade having an integral root and having paired cooling passages extending from the root to the tip of the blade and merging at both the tip and the root of the blade.

2. A process as set forth and defined in claim 1, wherein a slot is formed in the tip end of the blade after the machining has been completed.

References Cited in the file of this patent

UNITED STATES PATENTS

| | | |
|---|---|---|
| 906,029 | Johnson | Dec. 8, 1908 |
| 2,318,769 | Freeman et al. | May 11, 1943 |
| 2,350,952 | Acord | June 6, 1944 |
| 2,363,250 | Jenkins | Nov. 21, 1944 |
| 2,830,357 | Tunstall et al. | Apr. 15, 1958 |
| 2,914,841 | Graham | Dec. 1, 1959 |
| 2,972,807 | Turner et al. | Feb. 28, 1961 |

FOREIGN PATENTS

| | | |
|---|---|---|
| 755,610 | Great Britain | Aug. 22, 1956 |